(12) United States Patent
Yang et al.

(10) Patent No.: US 10,354,466 B1
(45) Date of Patent: Jul. 16, 2019

(54) INTELLIGENT IDENTIFICATION OF MIXED PHOTONIC LOCK STRUCTURE AND METHOD THEREOF

(71) Applicants: NATIONAL KAOHSIUNG MARINE UNIVERSITY, Kaohsiung (TW); Chi-Ta Yang, Kaohsiung (TW)

(72) Inventors: Chi-Ta Yang, Kaohsiung (TW); Yun-Sow Shieh, Kaohsiung (TW); Zih-Ruei Wang, Kaohsiung (TW); Ding-Yuan Wang, Kaohsiung (TW); Chih-Ting Liu, Kaohsiung (TW); Jun-Xiang Chang, Kaohsiung (TW); Xuan-Zhi Zhang, Kaohsiung (TW); Po-Ju Lin, Kaohsiung (TW); Guo-Wei Xu Zeng, Kaohsiung (TW)

(73) Assignees: National Kaohsiung Marine University, Kaohsiung (TW); Chi-Ta Yang, Kaohsiung (TW)

( * ) Notice: Subject to any disclaimer, the term of this patent is extended or adjusted under 35 U.S.C. 154(b) by 0 days.

(21) Appl. No.: 15/869,894

(22) Filed: Jan. 12, 2018

(51) Int. Cl.
| | |
|---|---|
| *G01J 1/44* | (2006.01) |
| *G07C 9/00* | (2006.01) |
| *E05B 47/00* | (2006.01) |
| *G05B 19/00* | (2006.01) |
| *H05B 33/08* | (2006.01) |

(52) U.S. Cl.
CPC .......... *G07C 9/00571* (2013.01); *G01J 1/44* (2013.01); *H05B 33/0803* (2013.01); *E05B 47/0001* (2013.01)

(58) Field of Classification Search
CPC ............................... E05B 17/10; H05B 37/02

USPC ........ 340/5.6, 5.64, 5.72; 341/176; 180/287; 307/10.4
See application file for complete search history.

(56) References Cited

U.S. PATENT DOCUMENTS

| | | | | |
|---|---|---|---|---|
| 5,543,665 | A | * | 8/1996 | Demarco ............... B60R 25/04 340/5.6 |
| 5,889,603 | A | * | 3/1999 | Roddy .................... B60R 25/04 340/5.64 |
| 6,275,141 | B1 | * | 8/2001 | Walter ................ B60R 25/2009 180/287 |
| 6,420,971 | B1 | * | 7/2002 | Leck ....................... E05B 39/04 340/542 |
| 6,710,700 | B1 | * | 3/2004 | Tatsukawa ............. B60R 25/04 340/5.52 |

(Continued)

FOREIGN PATENT DOCUMENTS

TW        I487829 B       6/2015

*Primary Examiner* — Nam V Nguyen
(74) *Attorney, Agent, or Firm* — Rosenberg, Klein & Lee

(57) ABSTRACT

The invention relates to a mixed photonic lock structure having intelligent identification and a method thereof. It comprises a mixed photonic key inserted into a mixed photonic lock body. A power supply unit of the mixed photonic lock body supplies the required power to the mixed photonic lock body and the mixed photonic key. An infrared (IR)-LED in the mixed photonic lock body emits a corresponding signal to an infrared photo detector (IR-PD) in the mixed photonic key. When the comparison conducted by a signal comparison circuit of the mixed photonic key matches, a RGB-LED emits a light signal password to a RGB PD of the mixed photonic lock body to control the lock to unlock after the comparison conducted by a signal comparison circuit of the mixed photonic lock body matches.

10 Claims, 4 Drawing Sheets

(56) References Cited

U.S. PATENT DOCUMENTS

| | | | | |
|---|---|---|---|---|
| 7,091,822 B2* | 8/2006 | Flick | ................ | G08C 17/02 |
| | | | | 340/5.2 |
| 8,866,066 B2* | 10/2014 | Fuse | ................ | E05B 49/006 |
| | | | | 250/231.1 |
| 9,524,599 B2* | 12/2016 | Lin | ................ | G07C 9/00182 |

* cited by examiner

INTELLIGENT IDENTIFICATION OF MIXED PHOTONIC LOCK STRUCTURE AND METHOD THEREOF

BACKGROUND OF THE INVENTION

1. Field of the Invention

The present invention relates to an intelligent identification of a mixed photonic lock structure and a method thereof which has a simplified overall structure and relative low costs in preparation and can be widely used in different fields to achieve anti-theft effects, so the present invention has increased practical features of overall implementation.

2. Description of Related Art

In daily life, constant occurrence of various criminal incidents, e.g. number of thefts, have been reported, so people usually install a variety of locks in different kinds of articles to ensure the safety of their life and property and achieve anti-theft effects.

Currently, there are a lot of locks on the market, and all kinds of locks have different characteristics to be selected for locking the different kinds of articles, e.g. mechanical horn lock, password lock, leaf lock, inductive card lock, magnet lock, RFID sensor lock, remote lock and the like. However, a lock core of the mechanical horn lock can be directly contacted, so the mechanical horn lock is easily destroyed and unlocked by thieves. Meanwhile, the inductive lock is easily decoded by the scanning of a sensing area, and a scan lateral recording frequency password of the remote control lock is easily replicated when the remote control lock is locked or unlocked. To solve abovementioned problems, some practitioners have developed a use of light waves emitted by LED light induction to lock or unlock a lock structure by light sensing so as to achieve high-security and anti-theft effects.

For instance, the Taiwan patent TWI487829 (B), issued on 11 Jun. 2015, disclosed an optical lock structure and a method using the same. The optical lock structure mainly comprises a corresponding optical key and an optical lock. The optical key has a PWM controller, a memory is connected to the PWM controller for storing a plurality of codes, a code saving switch, a code setting module connected to the memory, and a RGB LED connected to the PWM controller. The setting codes are saved in the memory by the code saving switch. The optical lock has an optical sensor corresponding to the RGB LED of the optical key, a signal comparison circuit connected to the optical sensor, a memory connected to the signal comparison circuit for storing a plurality of codes, and a lock head connected to the signal comparison circuit. The memory of the optical lock can save setting codes the same as a light source signal code emitted from the RGB LED by a code saving switch of the optical lock and directly provides plural setting codes in the signal comparison circuit.

Although the optical lock structure and its method mentioned above can achieve the expected effect of its anti-theft, they still have many disadvantages in the actual operation of use:

1. The optical lock structure needs to be connected with a power supply on the optical key and the optical lock, so the overall structure design of the optical lock structure is complicated and its manufacturing cost cannot be effectively reduced.

2. In an actual use, the optical key transmits the light source signal code to the optical lock for storage and record. However, the optical lock structure unlocks a lock also by the light key transmitting the same light source signal code to the optical lock for comparison and unlocking, so the optical lock structure is limited in use, and its anti-theft effect is also limited.

SUMMARY OF THE INVENTION

In view of the above-mentioned problems, the object of the present invention is to provide a mixed photonic lock structure having intelligent identification and a use method thereof. The present invention has a simplified overall structure and relative low costs in preparation and can be widely used in different fields to achieve anti-theft effects, so the present invention has increased practical features of overall implementation.

Disclosed herein is a mixed photonic lock structure having intelligent identification. It mainly comprises a mixed photonic key and a mixed photonic lock body.

The mixed photonic key has a power receiving terminal for receiving electric energy required by the mixed photonic key from the mixed photonic lock body, a first signal comparison circuit for comparing an input signal, a first memory unit connected to the first signal comparison circuit, a first password storage switch connected to the first memory unit, a first password setting module connected to the first password storage switch, an infrared photo detector connected to the first signal comparison circuit, a first pulse-width modulation controller connected to the first signal comparison circuit, and a RGB-LED connected to the first pulse-width modulation controller. The first memory unit saves and records a first light signal password set by the first password setting module through the first password storage switch, and the RGB-LED emits the first light signal password.

The mixed photonic lock body has a power supply unit for supplying electric energy required by the mixed photonic lock body, a second memory unit, a second password storage switch connected to the second memory unit, a second password setting module connected to the second password storage switch, a second pulse-width modulation controller connected to the second memory unit, an infrared-LED connected to the second pulse-width modulation controller and corresponding to the infrared photo detector of the mixed photonic key, a second signal comparison circuit connected to the second memory unit, a RGB-PD connected to the second signal comparison circuit and corresponding to the RGB-LED of the mixed photonic key, and a lock connected to the second signal comparison circuit. The power supply unit is provided with a power output terminal corresponding to the power receiving terminal of the mixed photonic key for transmitting the electric energy to the mixed photonic key. The second password storage switch transmits a second light signal password set by the second password setting module to the second memory unit for storage and record.

According to an embodiment of the present invention, the power supply unit of the mixed photonic lock body is further provided with a backup power supply.

Disclosed herein is also a use method of a mixed photonic lock structure having intelligent identification. It mainly comprises the steps of inserting a mixed photonic key into a mixed photonic lock body, contacting a power receiving terminal of the mixed photonic key with a power output terminal of a power supply unit of the mixed photonic lock body for providing electric energy required by the mixed photonic lock body and transmitting the electric energy required by the mixed photonic key from the power output terminal of the power supply unit to the power receiving terminal of the mixed photonic key, and respectively and correspondingly connecting an infrared photo detector and a RGB-LED of the mixed photonic key to an infrared-LED and a RGB-PD of the mixed photonic lock body. In such a way, a first memory unit of the mixed photonic key saves and records a first light signal password set by a first password setting module through a first password storage switch, and a second memory unit of the mixed photonic lock body saves and records a second light signal password set by a second password setting module through a second password storage switch so as to conduct a lock action of a lock of the mixed photonic lock body by the first light signal password and the second light signal password respectively set by the mixed photonic key and the mixed photonic lock body. A second pulse-width modulation controller of the mixed photonic lock body transmits a signal recorded by the second memory unit of the mixed photonic lock body through the infrared-LED to the infrared photo detector of the mixed photonic key. After the infrared photo detector receives the signal, a first signal comparison circuit of the mixed photonic key compares the signal of the mixed photonic lock body saved and recorded in the first memory unit. If the signal matches, a first pulse-width modulation controller emits the first light signal password recorded by the first memory unit to the RGB-PD of the mixed photonic lock body through the RGB-LED. After the RGB-PD receives the first light signal password, a second signal comparison circuit compares the second light signal password saved in the second memory unit with the first light signal password. If a comparison matches, the second signal comparison circuit conducts a unlock action of the lock.

DETAILED DESCRIPTION OF THE PREFERRED EMBODIMENT

Hereinafter, an exemplary embodiment of the present invention will be described in detail with reference to the accompanying drawings.

Figure 1:
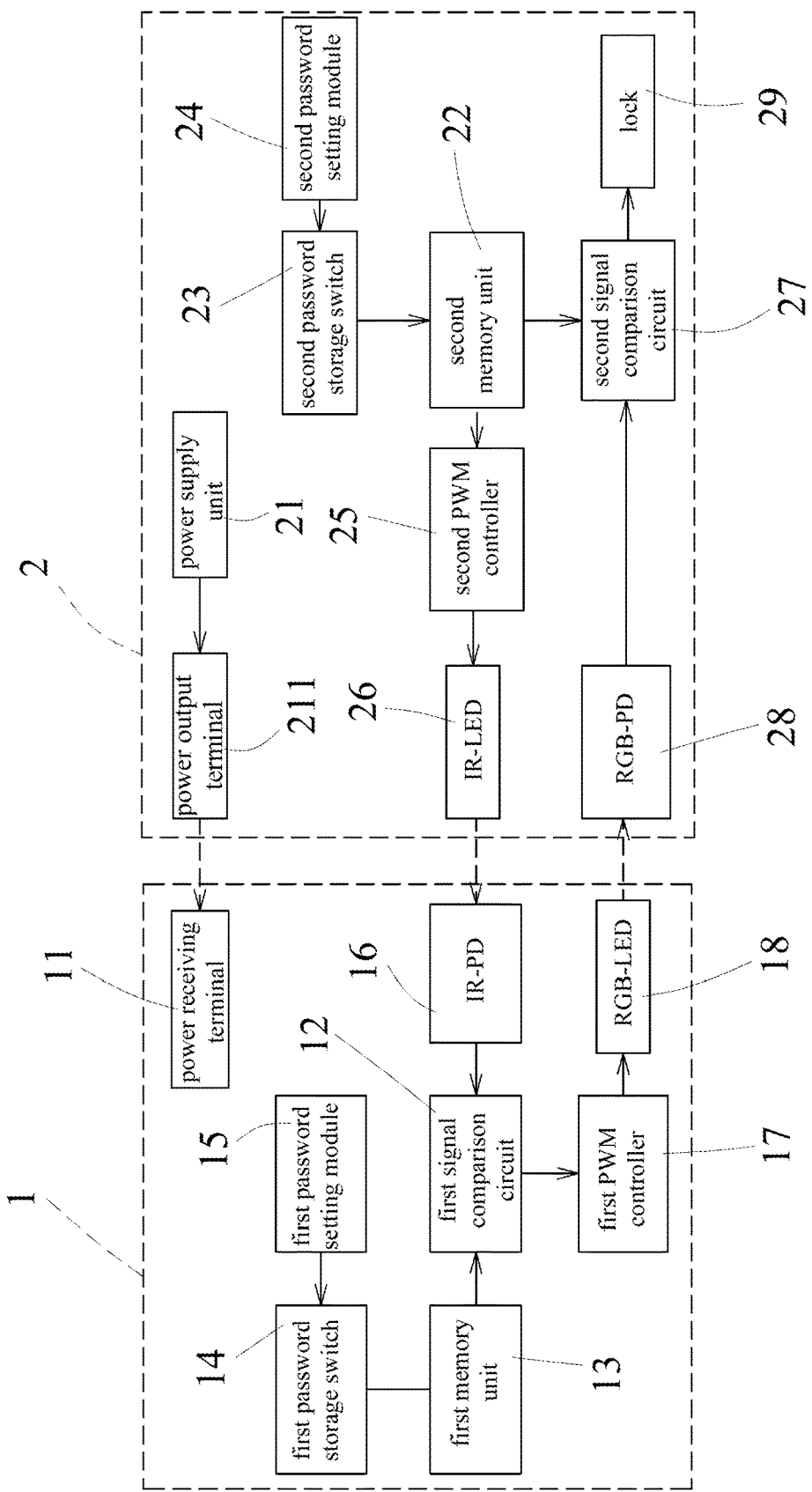
FIG. 1 is a block diagram showing a mixed photonic lock structure having intelligent identification according to the present invention.
Figure 2:
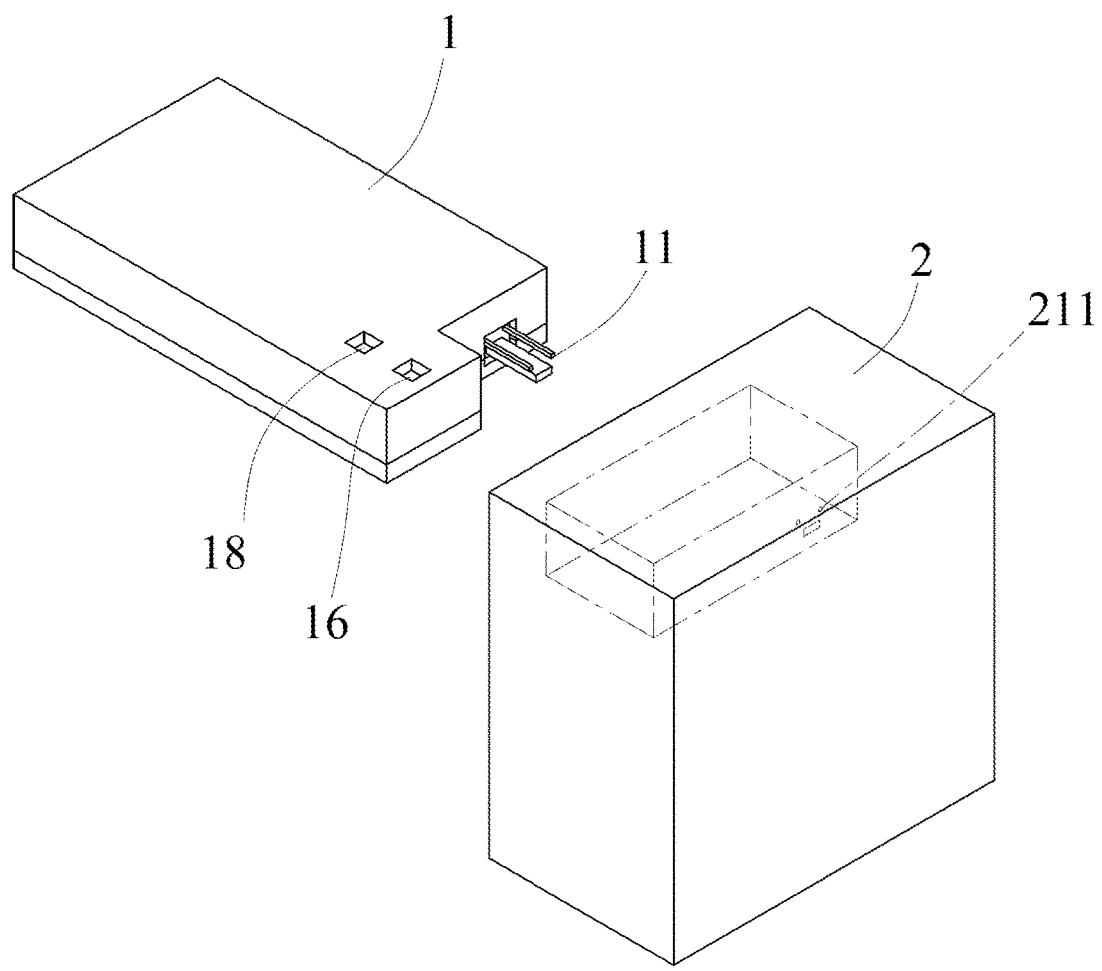
FIG. 2 is a stereogram showing a mixed photonic lock structure having intelligent identification according to the present invention.

As showed in FIG. 1 and FIG. 2, a block diagram and a stereogram showing a mixed photonic lock structure having intelligent identification according to the present invention are respectively disclosed. The mixed photonic lock structure having intelligent identification mainly comprises a mixed photonic key (1) and a mixed photonic lock body (2).

Figure 3:
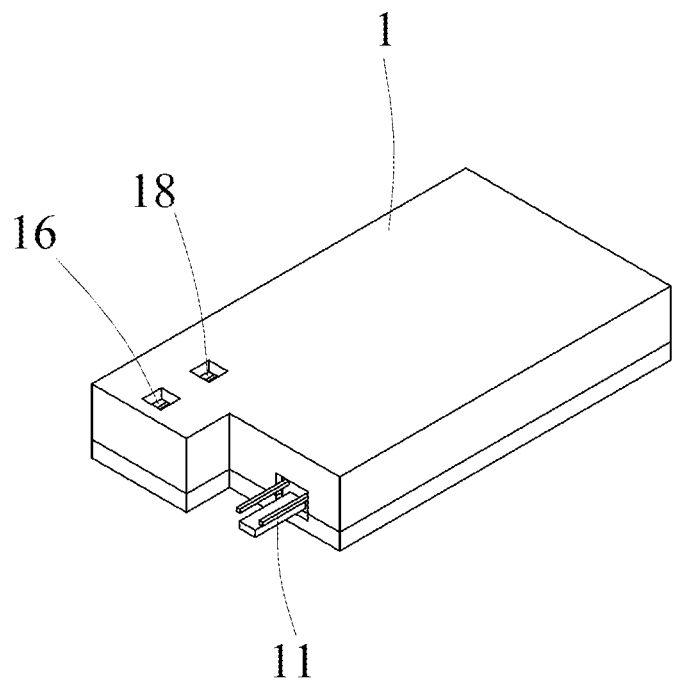
FIG. 3 is a stereogram showing a mixed photonic key according to the present invention.

As shown in FIG. 1 to FIG. 3, the mixed photonic key (1) has a power receiving terminal (11) for receiving electric energy required by the mixed photonic key (1) from the mixed photonic lock body (2), a first signal comparison circuit (12) for comparing an input signal, a first memory unit (13) connected to the first signal comparison circuit (12), a first password storage switch (14) connected to the first memory unit (13), and a first password setting module (15) connected to the first password storage switch (14). The first memory unit (13) saves and records a first light signal password set by the first password setting module (15) through the first password storage switch (14). The mixed photonic key (1) further has an infrared photo detector (IR-PD) (16) connected to the first signal comparison circuit (12), a first pulse-width modulation controller (17) connected to the first signal comparison circuit (12), and a red-green-blue light emitting diode (RGB-LED) (18) connected to the first pulse-width modulation controller (17) for emitting the first light signal password.

The mixed photonic lock body (2) has a power supply unit (21) for supplying electric energy required by the mixed photonic lock body (2). The power supply unit (21) is provided with a power output terminal (211) corresponding to the power receiving terminal (11) of the mixed photonic key (1) for transmitting the electric energy to the mixed photonic key (1) and further provided with a backup power supply in response to occurrence of earthquakes, natural disasters and other power outages. Furthermore, the mixed photonic lock body (2) has a second memory unit (22), a second password storage switch (23) connected to the second memory unit (22), and a second password setting module (24) connected to the second password storage switch (23). The second password storage switch (23) transmits a second light signal password set by the second password setting module (24) to the second memory unit (22) for storage and record. The mixed photonic lock body (2) further has a second pulse-width modulation controller (25) connected to the second memory unit (22), an infrared light emitting diode (IR-LED) (26) connected to the second pulse-width modulation controller (25) and corresponding to the infrared photo detector (16) of the mixed photonic key (1), a second signal comparison circuit (27) connected to the second memory unit (22), a red-green-blue photo detector (RGB-PD) (28) connected to the second signal comparison circuit (27) and corresponding to the RGB-LED (18) of the mixed photonic key (1), and a lock (29) connected to the second signal comparison circuit (27).

Figure 4:
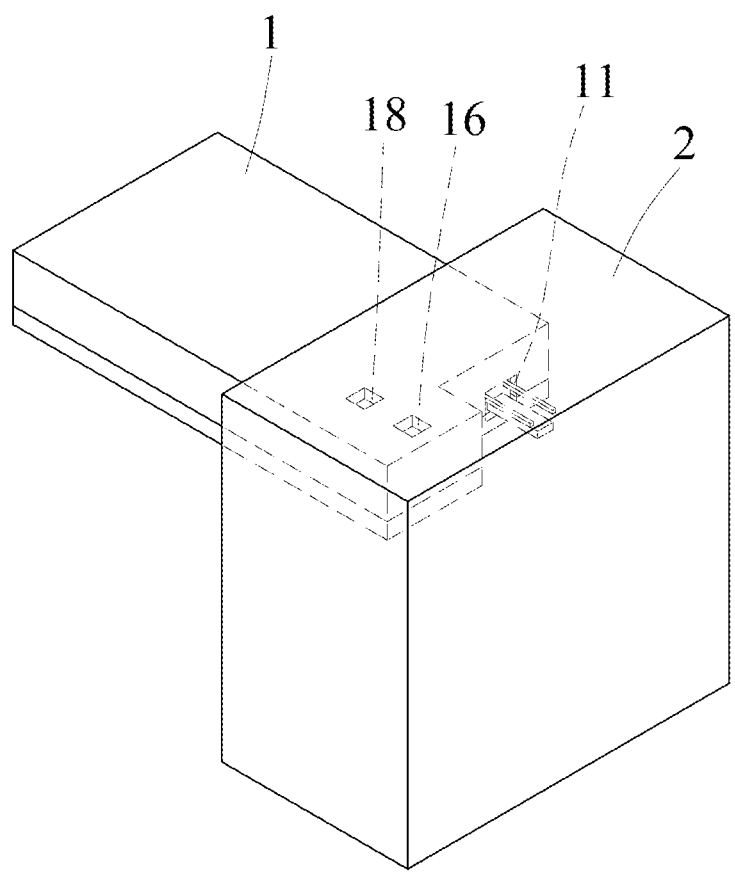
FIG. 4 is a stereogram showing a mixed photonic lock structure having intelligent identification in use according to the present invention.

Referring to FIG. 4, a stereogram showing a mixed photonic lock structure having intelligent identification in use according to the present invention is disclosed. In use of the present invention, a mixed photonic key (1) is inserted into a mixed photonic lock body (2) to allowing allow a power receiving terminal (11) of the mixed photonic key (1) to contact with a power output terminal (211) of a power supply unit (21) of the mixed photonic lock body (2) for providing electric energy required by the mixed photonic lock body (2) and transmitting the electric energy required by the mixed photonic key (1) from the power output terminal (211) of the power supply unit (21) to the power receiving terminal (11) of the mixed photonic key (1), and to simultaneously allow an infrared photo detector (16) and a RGB-LED (18) of the mixed photonic key (1) to respectively and correspondingly connect to an infrared-LED (26) and a RGB-PD (28) of the mixed photonic lock body (2). In such a way, a first memory unit (13) of the mixed photonic key (1) saves and records a first light signal password set by a first password setting module (15) through a first password storage switch (14), and a second memory unit (22) of the mixed photonic lock body (2) saves and records a second light signal password set by a second password setting module (24) through a second password storage switch (23) so as to conduct a lock action of a lock (29) of the mixed photonic lock body (2) by the first light signal password and the second light signal password respectively set by the mixed photonic key (1) and the mixed photonic lock body (2).

In the unlock process, a second pulse-width modulation controller (25) of the mixed photonic lock body (2) transmits a signal recorded by the second memory unit (22) of the mixed photonic lock body (2) through the infrared-LED (26) to the infrared photo detector (16) of the mixed photonic key (1). After the infrared photo detector (16) receives the signal, a first signal comparison circuit (12) of the mixed photonic key (1) compares the signal of the mixed photonic lock body (2) with a signal saved and recorded in the first memory unit (13). If the signal matches, a first pulse-width modulation controller (17) emits the first light signal password recorded by the first memory unit (13) to the RGB-PD (28) of the mixed photonic lock body (2) through the RGB-LED (18). After the RGB-PD (28) receives the first light signal password, a second signal comparison circuit (27) compares the second light signal password saved in the second memory unit (22) with the first light signal password. If a comparison matches, the second signal comparison circuit (27) conducts a unlock action of the lock (29).

Compared with the technique available now, the present invention has the following advantages:

1. The present invention only needs one power supply unit provided on the mixed photonic lock body to sufficiently supply electric energy required by the mixed photonic key and the mixed photonic lock body, which has a simplified overall structure and relative low costs in preparation. Furthermore, if a user loses the mixed photonic key, the mixed photonic key cannot be driven by the corresponding infrared-LED of the mixed photonic lock body to turn on the light signal password of the mixed photonic key due to the lack of the power supply unit, which can prevent the light signal password from being stolen by others.

2. The mixed photonic key of the present invention can be set to correspondingly unlock different mixed photonic lock bodies depending on its permission, so the present invention can be widely used in different fields to achieve anti-theft effects and has increased practical features of overall implementation.

What is claimed is:

1. A use method of a mixed photonic lock structure having intelligent identification, comprising:
   inserting a mixed photonic key into a mixed photonic lock body,
   contacting a power receiving terminal of the mixed photonic key with a power output terminal of a power supply unit of the mixed photonic lock body for providing electric energy required by the mixed photonic lock body,
   transmitting the electric energy required by the mixed photonic key from the power output terminal of the power supply unit to the power receiving terminal of the mixed photonic key,
   respectively and correspondingly connecting an infrared photo detector and a red-green-blue light-emitting diode (RGB-LED) of the mixed photonic key to an infrared light-emitting diode (infrared-LED) and a red-green-blue photo detector (RGB-PD) of the mixed photonic lock body, wherein a first memory unit of the mixed photonic key saves and records a first light signal password set by a first password setting module through a first password storage switch, and wherein a second memory unit of the mixed photonic lock body saves and records a second light signal password set by a second password setting module through a second password storage switch,
   transmitting, by a second pulse-width modulation controller of the mixed photonic lock body an activation signal of the mixed photonic lock body through the infrared-LED to the infrared photo detector of the mixed photonic key,
   emitting, by a first pulse-width modulation controller, the first light signal password recorded by the first memory unit to the RGB-PD of the mixed photonic lock body through the RGB-LED responsive to receipt of the activation signal in a first signal comparison circuit of the mixed photonic key,
   comparing, by a second signal comparison circuit, the second light signal password saved in the second memory unit with the first light signal password after the RGB-PD receives the first light signal password, and
   wherein the second signal comparison circuit conducts a unlock action of the lock if a comparison matches.

2. A mixed photonic lock structure having intelligent identification, comprising:
   a mixed photonic key including:
      a power receiving terminal,
      a key signal comparison circuit,
      a key memory unit connected to the key signal comparison circuit,
      a key password storage switch connected to the key memory unit,
      a key password setting module connected to the key password storage switch, the key memory unit being configured to record a key password set by the key password setting module through the key password storage switch,
      a key photo detector connected to the key signal comparison circuit,
      a key pulse-width modulation controller connected to the key signal comparison circuit, and
      a key light emitter connected to the key pulse-width modulation controller and configured to emit light signals within a key light wavelength range; and
   at least one mixed photonic lock body including:
      a power supply unit for supplying electric energy required by the mixed photonic lock body, the power supply unit being provided with a power output terminal corresponding to the power receiving terminal of the mixed photonic key for transmitting the electric energy to the mixed photonic key,
      a lock memory unit,
      a lock password storage switch connected to the lock memory unit,
      a lock password setting module connected to the lock password storage switch, the lock memory unit being configured to record a lock password set by the lock password setting module through the lock password storage switch,
      a lock pulse-width modulation controller connected to the lock memory unit,
      a lock light emitter connected to the lock pulse-width modulation controller and corresponding to the key photo detector of the mixed photonic key, the lock light emitter configured to emit light signals within a lock light wavelength range,
      a lock signal comparison circuit connected to the lock memory unit, a lock photo detector connected to the lock signal comparison circuit and corresponding to the key light emitter of the mixed photonic key, and a locking unit connected to the lock signal comparison circuit, wherein the lock light emitter transmits an activation light signal for receipt by the key photo detector, wherein the key light emitter, responsive to the activation light signal, transmits a password light signal for receipt by the lock photo detector, the password light signal including the key password recorded in the key memory unit, wherein the lock signal comparison circuit compares the key password of the transmitted password light signal to the lock password recorded in the lock memory unit, and wherein an unlock action of the locking unit is conducted responsive to the comparison of the received key password with the lock password.

3. The mixed photonic lock structure as claimed in claim 2, wherein the lock light wavelength range is different from the key light wavelength range.

4. The mixed photonic lock structure as claimed in claim 2, wherein at least one of the key light wavelength range and the lock light wavelength range includes infrared light wavelengths.

5. The mixed photonic lock structure as claimed in claim 2, wherein at least one of the key light wavelength range and the lock light wavelength range includes visible light wavelengths.

6. The mixed photonic lock structure as claimed in claim 2, wherein the power receiving terminal of the mixed photonic key and the power output terminal of the mixed photonic lock body are configured to couple in physical contact with each other.

7. The mixed photonic lock structure as claimed in claim 2, wherein, when the power receiving terminal of the mixed photonic key and the power output terminal of the mixed photonic lock body are coupled, the mixed photonic lock body covers the key light emitter.

8. The mixed photonic lock structure as claimed in claim 2, wherein the lock light emitter transmits the activation light signal responsive to coupling of the power receiving terminal of the mixed photonic key and the power output terminal of the mixed photonic lock body.

9. The mixed photonic lock structure as claimed in claim 2, wherein the key memory unit is configured to record a plurality of key passwords, wherein the key signal comparison circuit is configured to identify one of a plurality of activation light signals, and wherein the key light emitter includes one of the plurality of key passwords in the password light signal responsive to the identified activation light signal.

10. The mixed photonic lock structure as claimed in claim 9, comprising at least first and second lock bodies, wherein the lock memory unit of the second lock body records a lock password different from a lock password recorded in the lock memory unit of the first lock body, wherein the password light signal transmitted by the key light emitter of the mixed photonic key includes a first key password corresponding to the lock password recorded in the lock memory unit of the first lock body responsive to an activation light signal of the first lock body, and wherein the password light signal transmitted by the key light emitter of the mixed photonic key includes a second key password corresponding to the lock password recorded in the lock memory unit of the second lock body responsive to an activation light signal of the second lock body.

* * * * *